United States Patent [19]
Chen

[11] Patent Number: 6,023,117
[45] Date of Patent: Feb. 8, 2000

[54] MOTOR DEVICE SECURED BY ENGAGING ELEMENTS

[75] Inventor: Chang-Shun Chen, Tucheng, Taiwan

[73] Assignee: Delta Electronics, Incorporated, Taiwan

[21] Appl. No.: 09/197,199

[22] Filed: Nov. 20, 1998

[30] Foreign Application Priority Data

May 20, 1998 [TW] Taiwan ................................. 87207871

[51] Int. Cl.[7] .................................................... H02K 5/00
[52] U.S. Cl. ............................................ 310/91; 310/68 R
[58] Field of Search ................................ 310/91, 62, 63, 310/68 R; 417/423.14

[56] References Cited

U.S. PATENT DOCUMENTS

| | | | |
|---|---|---|---|
| 4,540,906 | 9/1985 | Blom ...................................... | 310/67 R |
| 4,806,081 | 2/1989 | Harmsen et al. ........................ | 417/354 |
| 4,910,420 | 3/1990 | Hoover et al. ......................... | 310/68 B |
| 5,436,519 | 7/1995 | Takahashi et al. ...................... | 310/217 |
| 5,506,458 | 4/1996 | Pace et al. .............................. | 310/67 R |
| 5,532,534 | 7/1996 | Baker et al. ............................. | 310/89 |
| 5,539,263 | 7/1996 | Lee ........................................ | 310/67 R |
| 5,574,321 | 11/1996 | Baker ..................................... | 310/67 R |

Primary Examiner—Nestor Ramirez
Assistant Examiner—Joseph Waks
Attorney, Agent, or Firm—Madson & Metcalf

[57] ABSTRACT

A motor device secured by an engaging element includes a frame, a bushing having a first bushing engaging element at one end thereof and connected to the frame at the other end thereof having a second bushing engaging element thereof, a stator sleeved on the bushing, a printed circuit board (PCB) arranged between the stator and the frame and sleeved on the bushing, a first fixing unit cooperating with the frame to position therebetween the stator, and having a first fixing engaging element engaging with the first bushing engaging element for securing the stator to the bushing, and a second fixing unit cooperating with the frame to position therebetween the PCB, and having a second fixing engaging element engaging with the second bushing engaging element for positioning the PCB with the bushing. The motor device further includes a shafted case having a case engaging element, coaxially mounted in the frame, and having a rotatable shaft. The rotatable shaft passes through the bushing to link the frame with an impeller. The impeller has an impeller engaging element engaging with the case engaging element to be secured to the shafted case for being actuated to provide a heat-dissipating effect.

37 Claims, 5 Drawing Sheets

MOTOR DEVICE SECURED BY ENGAGING ELEMENTS

FIELD OF THE INVENTION

The present invention relates to a motor device, and more particularly to a motor device secured by engaging elements.

BACKGROUND OF THE INVENTION

Typically, the parts of the motor device with a fan, such as the silicon steel, the impeller, and the printed circuit board (PCB), are assembled by an adhering agent or connected by the resilient elements. However, the motor device assembled by the adhering agent is not strong enough to support a big fan. The flexibility of the resilient elements may be changed at different temperature, resulting in a looseness of the connection of these parts.

As we know, these parts of a motor device with a big fan are usually assembled by engaging elements. However, the structure of the engaging elements are very complicated or inextricable so that it may waste some materials in the manufacturing process and take a lot of time to assemble the motor device. Thus, it is desirable to develop a method or an apparatus to assemble the motor device.

SUMMARY OF THE INVENTION

Therefore, a major object of the present invention is to provide a motor device secured by engaging, which is not easily loosened from the frame of the motor device.

The motor device according to the present invention includes a frame, a bushing having a first bushing engaging element at one end thereof and connected to the frame at the other end thereof having a second bushing engaging element thereof, a stator sleeved on the bushing, a printed circuit board (PCB) arranged between the stator and the frame and sleeved on the bushing, a first fixing unit cooperating with the frame to position therebetween the stator, and having a first fixing engaging element engaging with the first bushing engaging element for securing the stator to the bushing, and a second fixing unit cooperating with the frame to position therebetween the PCB, and having a second fixing engaging element engaging with the second bushing engaging element for positioning the PCB with the bushing.

In accordance with one aspect of the present invention, the first fixing engaging element of the first fixing unit further includes a first annular member having an opening in the center thereof, and a plurality of tongues protruding into the opening for engaging with the first bushing engaging element.

In accordance with another aspect of the present invention, the first bushing engaging element is an annular groove arranged at one end of the bushing.

In accordance with another aspect of the present invention, the tongues are inserted into the groove to secure thereto the stator when the first fixing unit is sleeved on the bushing.

In accordance with another aspect of the present invention, the second fixing engaging element of the second fixing unit includes a second annular member, and a plurality of hooks laterally extended from the second annular member for positioning the PCB with the bushing.

In accordance with another aspect of the present invention, the PCB has a central hole for passing therethrough the bushing and a plurality of notches provided around the central hole.

In accordance with another aspect of the present invention, the plurality of hooks of the second fixing engaging element respectively engage with the second bushing engaging element through the notches of the PCB respectively to position therewith the PCB.

In accordance with another aspect of the present invention, the second bushing engaging element includes a plurality of flanges provided around the end of the bushing.

In accordance with another aspect of the present invention, the motor device further includes a shafted case having a case engaging element, coaxially mounted in the frame, and having a rotatable shaft.

In accordance with another aspect of the present invention, the rotatable shaft passes through the bushing to link the frame with an impeller.

In accordance with another aspect of the present invention, the impeller has an impeller engaging element engaging with the case engaging element to be secured to the shafted case for being actuated to provide a heat-dissipating effect.

In accordance with another aspect of the present invention, the impeller engaging element includes a plurality of hooks.

In accordance with another aspect of the present invention, the case engaging element includes a plurality of holes for engaging therein the hooks of the impeller.

The present invention may best be understood through the following description with reference to the accompanying drawings, in which:

DETAILED DESCRIPTION OF THE PREFERRED EMBODIMENTS

Figure 1B:
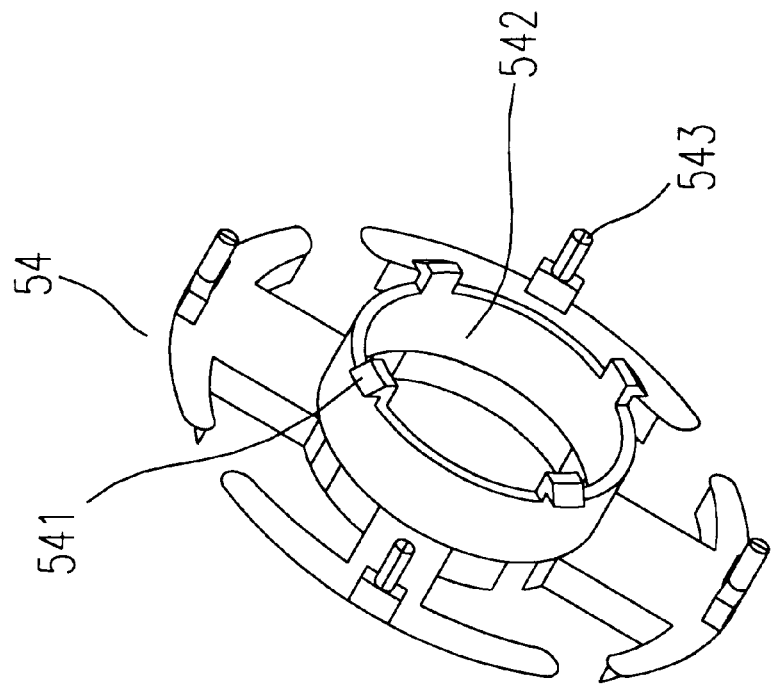
FIG. 1(*a*) and FIG. 1(*b*) are schematic diagrams showing structures of the fixing units according to the present invention.
Figure 1A:
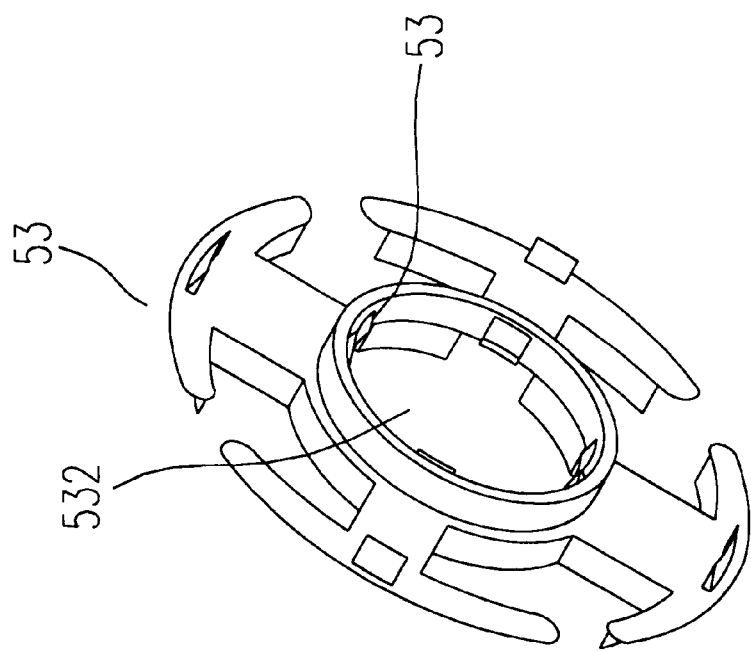

Referring to FIG. 1(*a*), the first fixing unit 53 includes a first annular member having an opening 532 in the center thereof and a plurality of tongues 531 protruding into the opening. In FIG. 1(*b*), the second fixing unit 54 includes a second annular member having an opening 542, a plurality of hooks 541 laterally extended from the second annular member, and a plurality of supports 543 extended from the second fixing unit.

Figure 2:
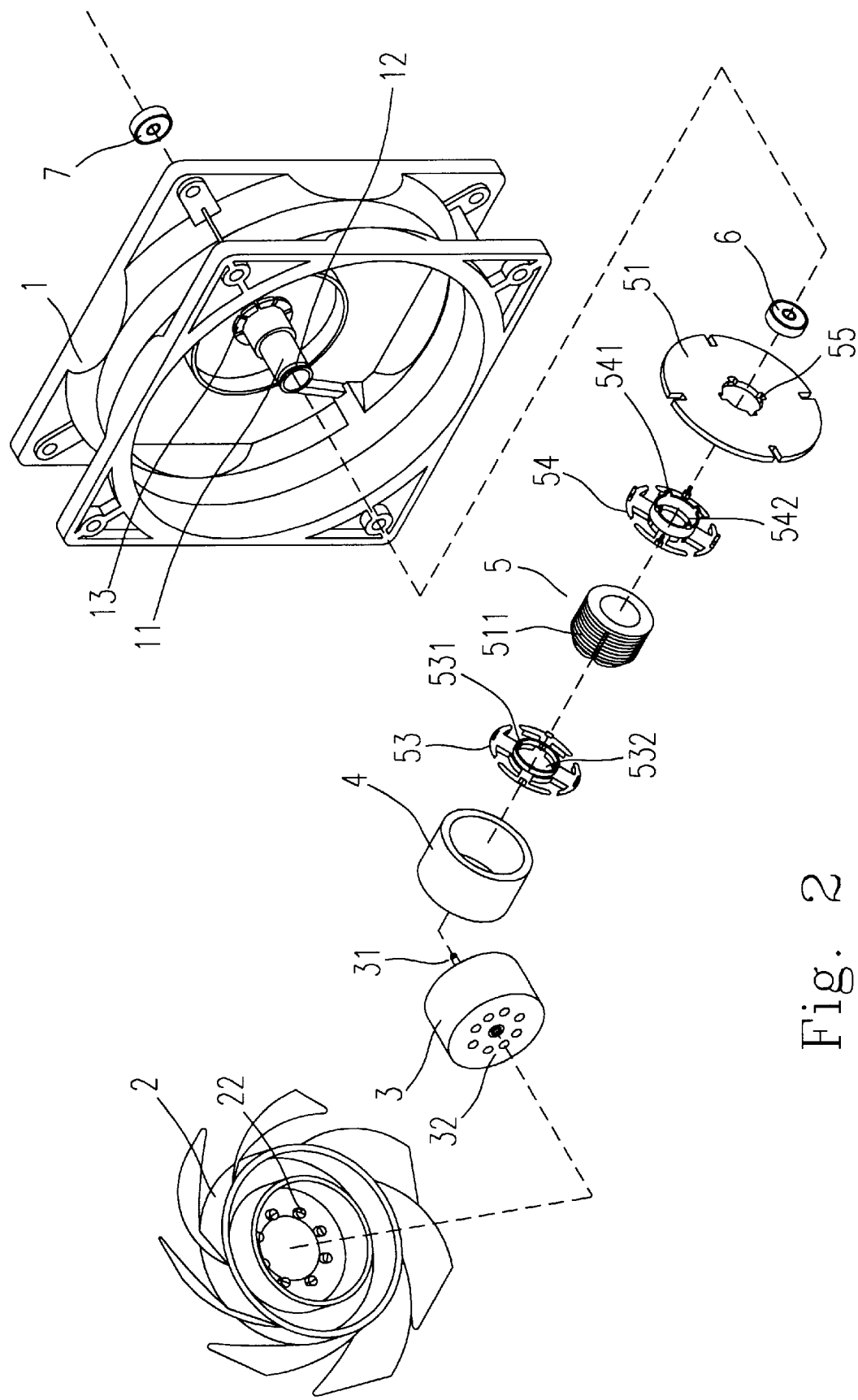
FIG. 2 is a schematic diagram showing an assembly of a motor device according to the present invention.
Figure 3:
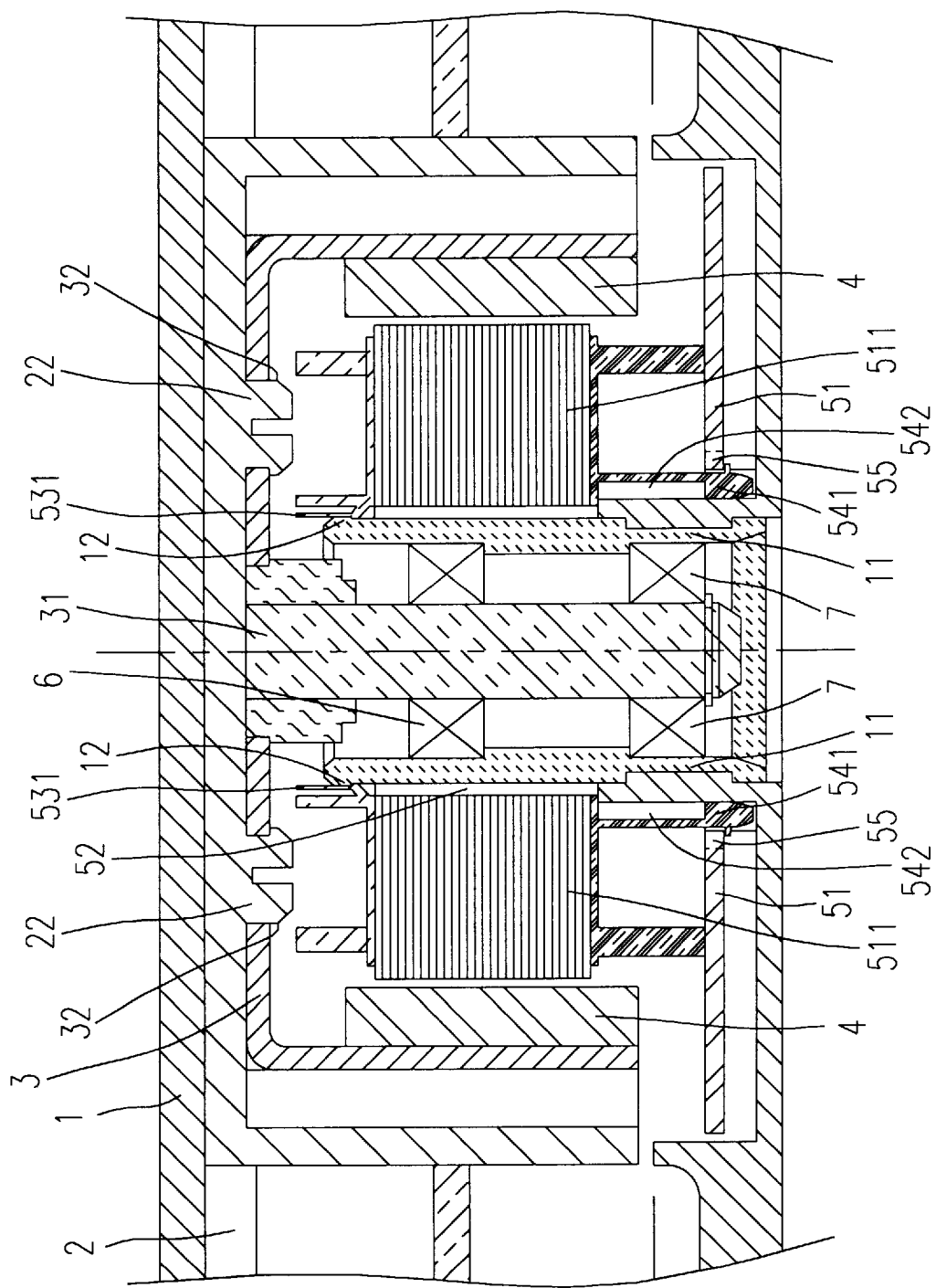
FIG. 3 is a sectional view of a motor device according to the present invention.

Please refer to FIG. 2 and FIG. 3, the bushing 11 is connected to the frame 1 at a first end thereof, and has a first bushing engaging element and a second bushing engaging element. The first bushing engaging element includes a plurality of flanges 13 provided around the first end of the bushing 11. The second bushing engaging element is an annular groove 12 on the second end of the bushing. A bearing 6 and a bearing 7 are sleeved on the bushing. Then, a printed circuit board (PCB) 51 is sleeved on the bushing and positioned by the second fixing unit 54. The PCB has a central hole for passing therethrough the bushing and a plurality of notches 55 provided around the central hole. The hooks 541 of the second fixing unit respectively engage with the flanges 13 of the bushing through the notches 55 of the PCB respectively to position therewith the PCB. The flanges also avoids the PCB from being contacted with the frame. A stator 5 and the first fixing unit 53 are then sleeved on the bushing 11. The tongues 531 of the first fixing unit 53 are inserted into the groove 12 on the bushing to secure the stator 5 to the bushing 11. A silicon steel 511 is positioned between these fixing units 53, 54. Finally, the magnet ring 4 surrounds the fixing units 53, 54 and the stator 5.

The rotatable shaft 31 passes through the bushing to link the frame with an impeller 2. The impeller 2 is engaged with the shafted case 3 to be secured to the case for being actuated to provide a heat-dissipating effect. The shafted case 3 has a case engaging element and the impeller has an impeller engaging element for engaging with the case engaging element. The impeller engaging element is a plurality of hooks 22, and the case engaging element is a plurality of holes 32 for engaging therein the hooks 22. The magnet ring 4 mentioned before is provided inside the case.

Figure 4:
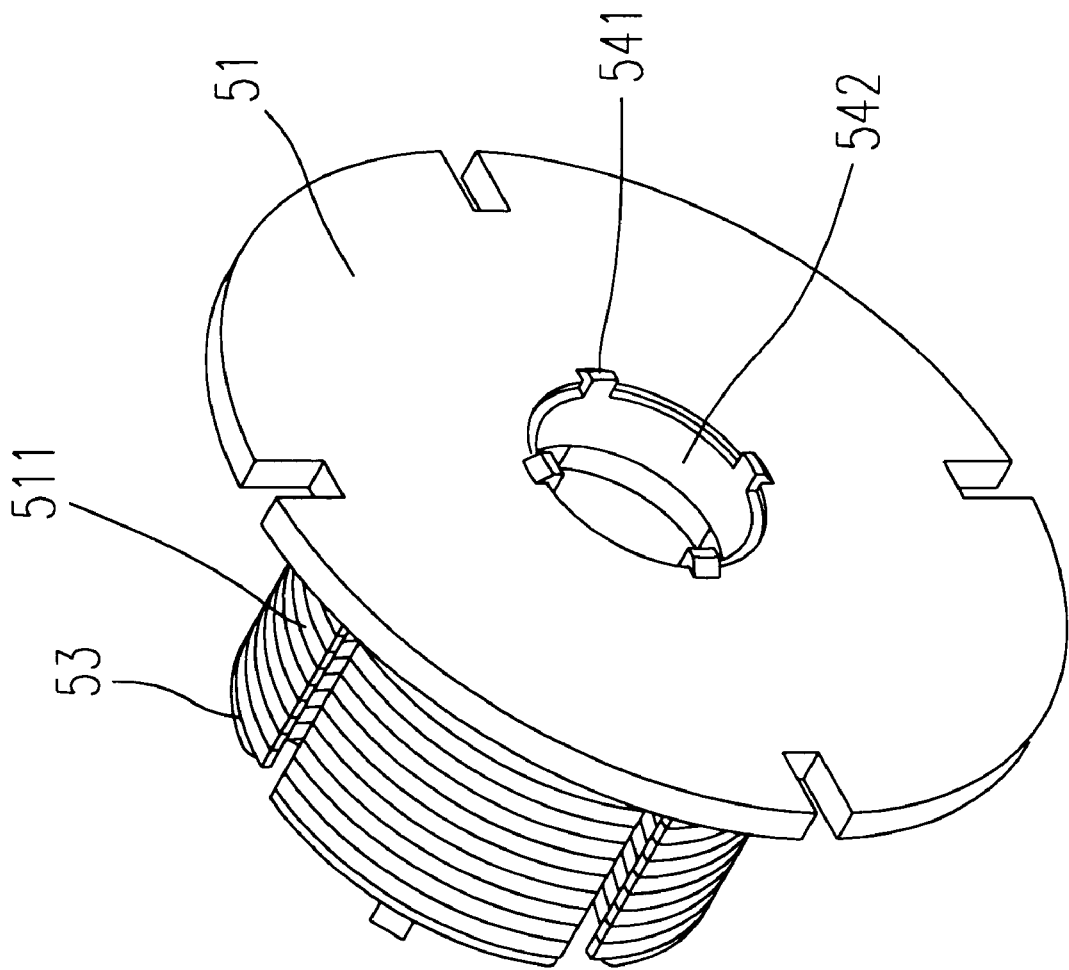
FIG. 4 and FIG. 5 respectively show the positions of these fixing units and the stator according to the prevent invention

Please refer to FIG. 4, the fixing units 53, 54 combine with the stator 5. The supports 543 of the second fixing unit is positioned against the PCB 51, and the hooks 541 of the second unit hook the PCB.

Figure 5:
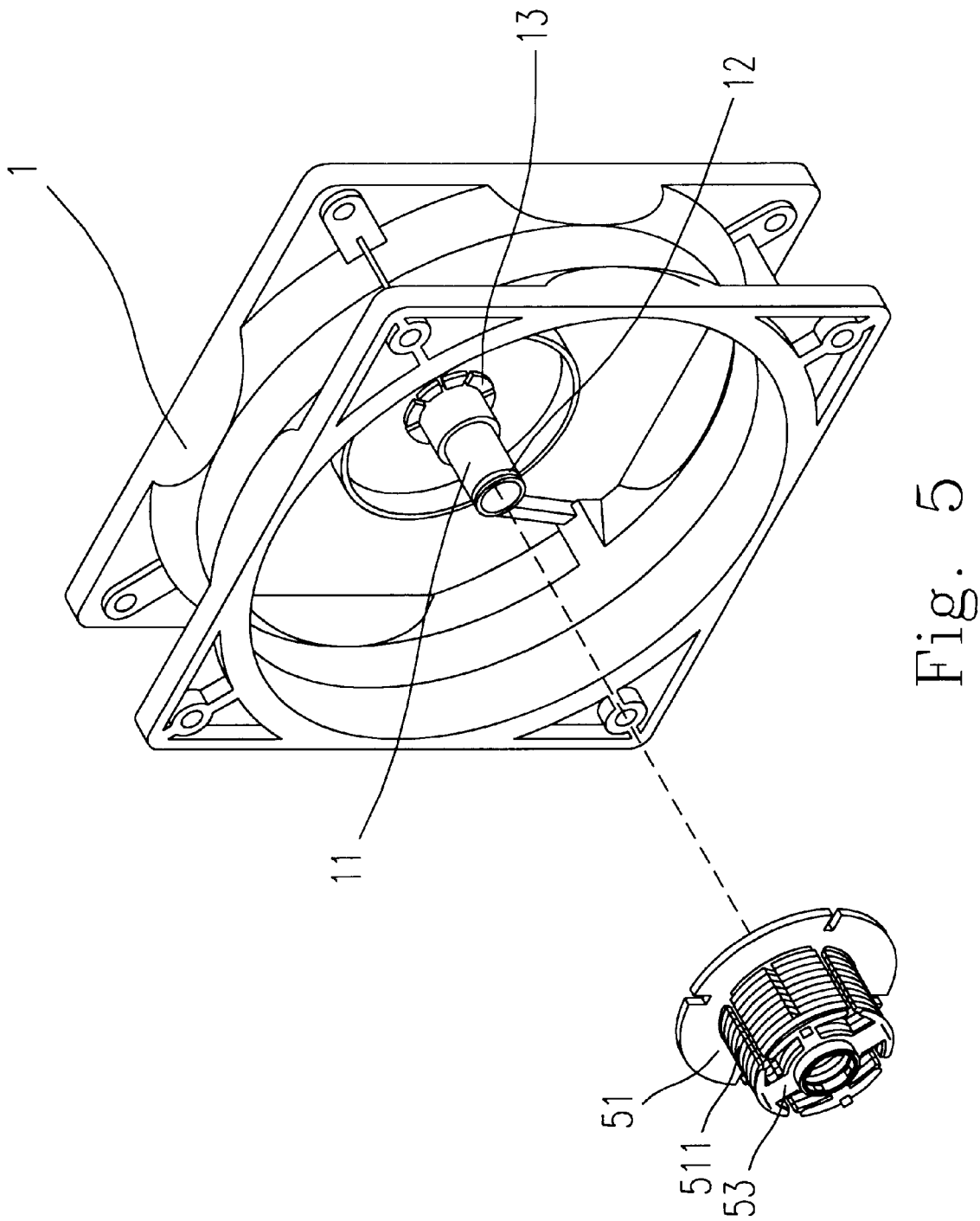

Referring to FIG. 5, the fixing units are sleeved on the bushing 11 after combining with the stator and the PCB. In order to fasten the fixing units to the frame 1, the tongues 531 of the first fixing unit are inserted into the groove 12 of the second bushing engaging element and the hooks of the second fixing unit respectively engage with the flanges 13 of the first bushing engaging element as shown in FIG. 5.

According to the present invention, the engaging elements of the motor device are very strong enough to support a big fan. These engaging elements of the motor device are also very simple. So, it may not waste any material in the manufacturing process or take a lot of time to assemble the motor device.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor device comprising:
    a frame;
    a bushing connected to said frame at a first end thereof, and having a first bushing engaging element at a second end thereof and a second bushing engaging member near said first end thereof;
    a stator sleeved on said bushing;
    a printed circuit board (PCB) arranged between said stator and said frame and sleeved on said bushing;
    a first fixing unit cooperating with said frame to position therebetween said stator, and having a plurality of tongues engaged with said first bushing engaging element for securing said stator to said bushing; and
    a second fixing unit cooperating with said frame to position therebetween said PCB, and having a plurality of hooks for engaging with said second bushing engaging element for positioning said PCB with said bushing.

2. The motor device according to claim 1 wherein said first fixing unit comprises a first annular member having an opening in a center thereof and said plurality of tongues protruding into said opening for engaging with said first bushing engaging element.

3. The motor device according to claim 2 wherein said first bushing engaging element is an annular groove arranged at said one end of said bushing.

4. The motor device according to claim 3 wherein said tongues of said first fixing unit are inserted into said groove to secure thereto said stator when said first fixing unit is sleeved on said bushing.

5. The motor device according to claim 1 wherein said motor device further comprises a shafted case coaxially mounted in said frame and having a case engaging element and a rotatable shaft.

6. The motor device according to claim 5 wherein said rotatable shaft passes through said bushing to link together said frame and an impeller.

7. The motor device according to claim 6 wherein said impeller has an impeller engaging element engaging with said case engaging element to be secured to said shafted case for being actuated to provide a heat-dissipating effect.

8. The motor device according to claim 7 wherein said impeller engaging element includes a plurality of hooks.

9. The motor device according to claim 8 wherein said case engaging element includes a plurality of holes for engaging therein said hooks of said impeller.

10. The motor device according to claim 1 wherein said second fixing unit comprises a second annular member and said plurality of hooks laterally extended from said second annular member for positioning said PCB with said bushing.

11. The motor device according to claim 10 wherein said PCB has a central hole for passing therethrough said bushing and a plurality of notches provided around said central hole.

12. The motor device according to claim 11 wherein said plurality of hooks of said second fixing unit respectively engage with said second bushing engaging element through said notches of said PCB respectively to position therewith said PCB.

13. The motor device according to claim 12 wherein said second bushing engaging element includes a plurality of flanges provided around said end of said bushing.

14. A motor device comprising:
    a frame;
    a bushing connected to said frame at a first end thereof, and having a first bushing engaging element near said first end thereof;
    a printed circuit board (PCB) sleeved on said bushing; and
    a first fixing unit cooperating with said frame to position therebetween said PCB, and having a first annular member and a plurality of hooks laterally extended from said first annular member engaging with said first bushing engaging element for positioning said PCB with said bushing.

15. The motor device according to claim 14 wherein said PCB has a central hole for passing therethrough said bushing and a plurality of notches provided around said central hole.

16. The motor device according to claim 15 wherein said plurality of hooks of said first fixing unit respectively engage with said first bushing engaging element through said notches of said PCB respectively to position therewith said PCB.

17. The motor device according to claim 16 wherein said first bushing engaging element includes a plurality of flanges provided around said first end of said bushing.

18. The motor device according to claim 14 wherein said motor device further comprises:
    a shafted case coaxially mounted in said frame, and having a case engaging element a rotatable shaft;

said bushing connected to said frame at said first end thereof, and having a second bushing engaging element at a second end thereof;

a stator sleeved on said bushing; and a second fixing unit cooperating with said frame to position therebetween said stator, and engaging with said second bushing engaging element for securing said stator to said bushing.

19. The motor device according to claim 18 wherein said second fixing unit comprises:

a second annular member having an opening in a center thereof; and a plurality of tongues protruding into said opening for engaging with said second bushing engaging element.

20. The motor device according to claim 19 wherein said second bushing engaging element is an annular groove arranged at said first end of said bushing.

21. The motor device according to claim 20 wherein said tongues are inserted into said groove to secure thereto said stator when said second fixing unit is sleeved on said bushing.

22. The motor device according to claim 21 wherein said rotatable shaft passes through said bushing to link together said frame and an impeller.

23. The motor device according to claim 22 wherein said impeller has an impeller engaging element engaging with said case engaging element to be secured to said shafted case for being actuated to provide a heat-dissipating effect.

24. The motor device according to claim 23 wherein said impeller engaging element includes a plurality of hooks.

25. The motor device according to claim 24 wherein said case engaging element includes a plurality of holes for engaging therein said hooks of said impeller engaging element.

26. A heat-dissipating device comprising:

a frame mounting thereon motor elements wherein said motor elements include a first fixing unit having a plurality of tongues and a second fixing unit having a plurality of hooks, cooperating with said frame, for securing said motor elements to said frame;

a shafted case having a case engaging element and a rotatable shaft, coaxially mounted in said frame, housing therein said motor elements; and an impeller having an impeller engaging element engaging with said case engaging element to be secured to said shafted case for being actuated to provide a heat-dissipating effect.

27. The heat-dissipating device according to claim 26 wherein said impeller engaging element includes a plurality of hooks.

28. The heat-dissipating device according to claim 27 wherein said case engaging element includes a plurality of holes for engaging therein said hooks of said impeller engaging element.

29. The heat-dissipating device according to claim 26 wherein said rotatable shaft passes through a bushing of said motor elements to link said impeller with said frame.

30. The heat-dissipating device according to claim 26 wherein said motor elements comprise:

a bushing having a first bushing engaging element at a first end thereof and connected to said frame at a second end thereof having a second bushing engaging element thereof;

a stator sleeved on said bushing;

a printed circuit board (PCB) arranged between said stator and said frame and sleeved on said bushing;

said first fixing unit cooperating with said frame to position therebetween said stator, and engaging with said first bushing engaging element for securing said stator to said bushing; and said second fixing unit cooperating with said frame to position therebetween said PCB, and engaging with said second bushing engaging element for positioning said PCB with said bushing.

31. The heat-dissipating device according to claim 30 wherein said first fixing unit comprises a first annular member having an opening in a center thereof and said plurality of tongues protruding into said opening for engaging with said first bushing engaging element.

32. The heat-dissipating device according to claim 31 wherein said first bushing engaging element is an annular groove arranged at said first end of said bushing.

33. The heat-dissipating device according to claim 32 wherein said tongues of said first fixing unit are inserted into said groove to secure thereto said stator when said first fixing unit is sleeved on said bushing.

34. The heat-dissipating device according to claim 30 wherein said second fixing unit comprises a second annular member and said plurality of hooks laterally extended from said second annular member for positioning said PCB with said bushing.

35. The heat-dissipating device according to claim 34 wherein said PCB has a central hole for passing therethrough said bushing and a plurality of notches provided around said central hole.

36. The heat-dissipating device according to claim 35 wherein said plurality of hooks of said second fixing unit respectively engage with said second bushing engaging element through said notches of said PCB respectively to position therewith said PCB.

37. The heat-dissipating device according to claim 36 wherein said second bushing engaging element includes a plurality of flanges provided around said end of said bushing.

* * * * *